(12) United States Patent
Freeman et al.

(10) Patent No.: US 8,826,429 B2
(45) Date of Patent: Sep. 2, 2014

(54) INFORMATION SECURITY MANAGEMENT

(75) Inventors: Roland N. Freeman, Kingston, MD (US); Depti Patel, Agoura Hills, CA (US); Luis Alfonso Vinuelas, Scottsdale, AZ (US); Robert John Rencher, Normandy Park, WA (US); Faye Francy, Baltimore, MD (US)

(73) Assignee: The Boeing Company, Chicago, IL (US)

( * ) Notice: Subject to any disclaimer, the term of this patent is extended or adjusted under 35 U.S.C. 154(b) by 48 days.

(21) Appl. No.: 13/572,298

(22) Filed: Aug. 10, 2012

(65) Prior Publication Data

US 2013/0263258 A1  Oct. 3, 2013

Related U.S. Application Data (60) Provisional application No. 61/619,348, filed on Apr. 2, 2012.

(51) Int. Cl.
*G06F 12/14* (2006.01)

(52) U.S. Cl.
USPC .......................................................... 726/22

(58) Field of Classification Search
None
See application file for complete search history.

(56) References Cited

U.S. PATENT DOCUMENTS

| | | | |
|---|---|---|---|
| 6,996,173 B2 | 2/2006 | Wu et al. | |
| 7,386,888 B2 | 6/2008 | Liang et al. | |
| 8,355,433 B2 | 1/2013 | Park et al. | |
| 2005/0050336 A1 | 3/2005 | Liang et al. | |
| 2010/0192223 A1* | 7/2010 | Ismael et al. | 726/22 |
| 2011/0131648 A1 | 6/2011 | Gargett | |
| 2011/0268178 A1 | 11/2011 | Park et al. | |

FOREIGN PATENT DOCUMENTS

EP  1650930 A1  4/2006

OTHER PUBLICATIONS

EP search report dated Jul. 18, 2013 regarding application 13161774.8-1856, reference NAM/P126221EP00, applicant The Boeing Company, 6 pages.
Richards et al., "Design for Survivability: Concept Generation and Evaluation in Dynamic Tradespace Exploration," Second International Symposium on Engineering Systems, Jun. 15-17, 2009, 14 PAGES.
"ED-202 Airworthiness Security Process Specification," WG-72 Aeronautical Systems Security, EUROCAE.net, copyright 2012, 1 PAGE, accessed Aug. 8, 2012 http://www.eurocae.net/working-groups/wg-list/41-wg-72.html.
"DO-326, Airworthiness Security Process Specification," SC-216, Aeronautical Systems Security, RTCA, Inc., Dec. 2010, 1 PAGE, accessed Aug. 8, 2012 http://www.rtca.org/comm/committee.cfm?id=76.

(Continued)

*Primary Examiner* — Brandon Hoffman
(74) *Attorney, Agent, or Firm* — Yee & Associates, P.C.

(57) ABSTRACT

A system and method for information security management. An anomaly in data traffic directed to a data processing environment is identified. The anomaly indicates a threat to the data processing environment. The data processing environment comprises a number of data processing systems. A threatened data processing system is identified. The threatened data processing system is one of the number of data processing systems to which the threat is directed. The threatened data processing system is isolated. The threatened data processing system is monitored after the threatened data processing system is isolated. The threatened data processing system is replicated to form a replicated data processing system.

22 Claims, 7 Drawing Sheets

(56) References Cited

OTHER PUBLICATIONS

"Security Categorization and Control Selection for National Security Systems," The Committee on National Security Systems Instruction ("CNSSI"), CNSSI No. 1253, Version 2, Mar. 2012, 85 PAGES.

"Standards for Security Categorization of Federal Information and Information Systems," Federal Information Processing Standards Publication FIPS PUB 199, Computer Security Division, Information Technology Laboratory, U.S. Department of Commerce, Feb. 2004, 13 PAGES.

"Information Assurance Technical Framework ("IATF")," National Security Agency, Information Assurance Solutions, Release 3.0, Sep. 2000, 774 PAGES.

"Guide for Applying to the Risk Management Framework to Federal Information Systems; A Security Life Cycle Approach," Information Security, Computer Security Division, National Institute of Standards and Technology, U.S. Department of Commerce, NIST Special Publication 800-37, Rev. 1, Feb. 2010, 93 PAGES.

"Recommended Security Controls for Federal Information Systems and Organizations," Information Security, Computer Security Division, National Institute of Standards and Technology, U.S. Department of Commerce, NIST Special Publication 800-53, Rev. 3, Aug. 2009, 237 PAGES.

"Guide for Assessing the Security Controls in Federal Information Systems and Organizations; Building Effective Security Assessment Plans," Information Security, Computer Security Division, National Institute of Standards and Technology, U.S. Department of Commerce, NIST Special Publication 800-53A, Rev. 1, Jun. 2010, 399 PAGES.

Sampigethaya et al., "Secure Operation, Control and Maintenance of Future E-enabled Airplanes," IEEE Special Issue on Aviation Information Systems, vol. 96, Issue 12, Dec. 2008, 13 PAGES.

"Sample—Safety Management System Risk Matrix," Center for Advanced Aviation System Development, The Mitre Corporation, copyright 2012, 4 PAGES, accessed Aug. 10, 2012 http://www.mitrecaasd.org/SMS/doc/Sample_Risk_Matrix.pdf.

Diver, "Information Security Policy—A Development Guide for Large and Small Companies," SANS Institute, InfoSec Reading Room, Jul. 2006, 43 PAGES.

"Safety Management System (SMS) Implementation Guide," Federal Aviation Administration, Flight Standards Service—SMS Program office, Rev. 3, Jun. 2010, 161 PAGES.

* cited by examiner

INFORMATION SECURITY MANAGEMENT

RELATED PROVISIONAL APPLICATION

This application is related to and claims the benefit of priority of provisional U.S. Patent Application Ser. No. 61/619,348, filed Apr. 2, 2012, entitled "Information Security Management System (ISMS) Framework for Commercial and Non-Commercial entities", which is incorporated herein by reference.

BACKGROUND INFORMATION

1. Field

The present disclosure relates generally to systems and methods for information security management by detecting and responding to threats to data processing environments that may include a number of data processing systems connected to a network. More particularly, the present disclosure relates to identifying a data processing system that is the target of a threat to a data processing environment and responding to the threat in a manner that reduces disruption to the data processing environment.

2. Background

A variety of commercial, governmental, and other entities may perform numerous functions in a data processing environment. The data processing environment may include a number of data processing systems. For example, a data processing environment may include a host data processing system and a number of guest data processing systems associated with the host data processing system. The data processing environment may be configured to receive network traffic from a variety of sources via a network connection. Received network traffic may be directed by the host data processing system to the number of guest data processing systems as appropriate.

A data processing environment connected to a network may be subject to a number of threats. For example, such a threat may include an attempt to affect the performance of the data processing environment in undesired ways. A threat against a data processing system in the data processing environment may be recognized by detecting an anomaly in the network traffic directed to the data processing system.

Information security management is a common problem faced by various economic sectors employing network-centric operations where a safety-first principal is central. An air traffic control system is an example of such a system including a data processing environment that may be subject to a number of threats. Information systems for air traffic control may include networked ground systems and satellite systems, air-to-ground, air-to-satellite and air-to-air interfaces, and stakeholder organizations and authorized personnel and processes.

A fundamental difference between safety and information security management in air traffic control systems is that existing safety guidelines may not consider malicious activities that may emerge with the use of computer network capabilities in the national airspace system. Safety and information security management, however, may have commonalities in consequences of dangers and incidents in the air traffic control systems. Therefore, a safety management system framework may be applicable to information security management. However, a safety management system framework also may have major gaps with respect to information security management. Processes and approaches that can potentially bridge these gaps are desirable. Considerations for assessing information security risks from any changes to the national airspace system and defining information security controls for risk mitigation also are desirable.

A safety management system may cover safety hazards and not the cause of these hazards. Hence, if a malicious activity causes a safety hazard, the impact such as danger, incident, or harm to the asset of the malicious activity may be covered by the safety management system. It is desirable, however, that an information security management system is configured to assess and evaluate the likelihood of this malicious activity, other potential consequences of this malicious activity that may not be covered by the safety management system, design security assurance functions that lower the likelihood, and promote the security assurance functions.

Information security measures are desirable for air traffic control systems to ensure that no hazard or incident can be introduced through intended system operation, unanticipated errors in applications, unexpected environmental conditions, or deliberate malicious attack. Additionally, security measures may be desirable to ensure that organizations involved in developing, operating, and servicing the air traffic control system and supporting the air traffic control mission of efficiently, safely, and securely managing air traffic in the national airspace system, may operate their businesses effectively and in fulfillment of legal requirements and business objectives.

It is desirable to respond to the detection of a threat against a data processing environment in a manner that protects the data processing environment, including the data being processed in the data processing environment, from the potential threat. However, responding to a detected threat may itself disrupt operation of the data processing environment.

Accordingly, it would be beneficial to have a method and apparatus that takes into account one or more of the issues discussed above as well as possibly other issues.

SUMMARY

An illustrative embodiment of the present disclosure provides a method for information security management. An anomaly in data traffic directed to a data processing environment is identified. The anomaly indicates a threat to the data processing environment. The data processing environment comprises a number of data processing systems. A threatened data processing system is identified. The threatened data processing system is one of the number of data processing systems to which the threat is directed. The threatened data processing system is isolated. The threatened data processing system is monitored after isolating the threatened data processing system. The threatened data processing system is replicated to form a replicated data processing system.

Another illustrative embodiment of the present disclosure provides an apparatus comprising an information security management system implemented in a data processing environment. The data processing environment comprises a number of data processing systems. The information security management system is configured to identify an anomaly in data traffic directed to the data processing environment, wherein the anomaly indicates a threat to the data processing environment, identify a threatened data processing system, wherein the threatened data processing system is one of the number of data processing systems to which the threat is directed, isolate the threatened data processing system, monitor the threatened data processing system after the threatened data processing system is isolated, and replicate the threatened data processing system to form a replicated data processing system.

According to still another illustrative embodiment of the present disclosure a method for information security management is provided. An anomaly in data traffic directed to a data processing environment is identified. The anomaly indicates a threat to the data processing environment. The data processing environment comprises a threatened host data processing system and a number of guest data processing systems associated with the threatened host data processing system. Responsive to identifying the threat being directed to the threatened host data processing system, the number of guest data processing systems are moved from the threatened host data processing system to a new host data processing system. A portion of the data traffic that is verified not to include anomalies is directed to the new host data processing system. The data traffic is directed to the threatened host data processing system after moving the number of guest data processing systems from the threatened host data processing system to the new host data processing system. The threatened host data processing system is monitored after moving the number of guest data processing systems from the threatened host data processing system to the new host data processing system.

In another illustrative embodiment of the present disclosure an apparatus comprising an information security management system implemented in a data processing environment is provided. The data processing environment comprises a threatened host data processing system and a number of guest data processing systems associated with the threatened host data processing system. The information security management system is configured to identify an anomaly in data traffic directed to the data processing environment, wherein the anomaly indicates a threat to the data processing environment, move the number of guest data processing systems from the threatened host data processing system to a new host data processing system responsive to identifying the threat being directed to the threatened host data processing system, direct a portion of the data traffic that is verified not to include anomalies to the new host data processing system, direct the data traffic to the threatened host data processing system after the number of guest data processing systems are moved from the threatened host data processing system to the new host data processing system, and monitor the threatened host data processing system after the number of guest data processing systems are moved from the threatened host data processing system to the new host data processing system.

In still another illustrative embodiment of the present disclosure a method for information security management is provided. An anomaly in data traffic directed to a data processing environment is identified. The anomaly indicates a threat to the data processing environment. The data processing environment comprises a host data processing system and a number of guest data processing systems associated with the host data processing system. Responsive to identifying the threat being directed to a threatened guest data processing system, wherein the threatened guest data processing system is one of the number of guest data processing systems, the threatened guest data processing system is replicated to form a replicated guest data processing system associated with the host data processing system. A portion of the data traffic that is verified not to include anomalies is directed to the replicated guest data processing system. The threatened guest data processing system is moved to an isolation host data processing system. The data traffic is directed to the threatened guest data processing system after moving the threatened guest data processing system to the isolation host data processing system. The threatened guest data processing system is monitored after moving the threatened guest data processing system to the isolation host data processing system.

Another illustrative embodiment of the present disclosure provides an apparatus comprising an information security management system implemented in a data processing environment. The data processing environment comprises a host data processing system and a number of guest data processing systems associated with the host data processing system. The information security management system is configured to identify an anomaly in data traffic directed to the data processing environment, wherein the anomaly indicates a threat to the data processing environment, replicate a threatened guest data processing system to form a replicated guest data processing system associated with the host data processing system responsive to the threat being directed to the threatened guest data processing system, wherein the threatened guest data processing system is one of the number of guest data processing systems, direct a portion of the data traffic that is verified not to include anomalies to the replicated guest data processing system, move the threatened guest data processing system to an isolation host data processing system, direct the data traffic to the threatened guest data processing system after the threatened guest data processing system is moved to the isolation host data processing system, and monitor the threatened guest data processing system after the threatened guest data processing system is moved to the isolation host data processing system.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

DETAILED DESCRIPTION

The different illustrative embodiments recognize and take into account a number of different considerations. "A number", as used herein with reference to items, means one or more items. For example, "a number of different considerations" means one or more different considerations.

The illustrative embodiments recognize and take into account that current systems and methods for responding to a potential threat to a data processing environment may affect operation of the data processing environment in undesired ways. For example, in response to a detected threat directed against a host data processing system over a network connection, the entire data processing environment associated with the host data processing system may be disconnected from the network and isolated to prevent intrusions and corruptions. Guest data processing systems associated with the host data processing system also may be secured to prevent transitive corruptions. In this case, activity by the guest data processing systems is disrupted in response to a threat to the host system.

When an anomaly in network traffic is determined to be a threat to a guest data processing system, the current response may be to shut down the entire data processing environment, including the host data processing system, to prevent cross contamination of the threat to other guest systems associated with the host system. In this case, activity by all of the guest data processing systems in the data processing environment may be disrupted in response to a threat to only one of the guest systems. This type of response to a perceived threat to the data processing environment is purely reactive and may result in an undesirable impact to the operations of business units or other entities using the data processing environment.

Illustrative embodiments provide a system and method for responding to a threat to a data processing environment in a manner that protects the data processing environment from the threat while reducing undesirable disruptions to operation of the data processing environment. In accordance with an illustrative embodiment, detecting an anomaly in network data traffic to the data processing environment may indicate a potential threat to the data processing environment. Particular data processing systems in the data processing environment that may be the target of the threat are identified. For example, the threat may be identified as being directed to the host data processing system or to a guest data processing system.

The data processing system that is identified as the target of the threat may be isolated. Data traffic may continue to be directed to the isolated system. The isolated system and network traffic may be monitored and analyzed, for example, to identify more detail about the threat, such as the intent of the threat.

The data processing system that is the target of the threat may be replicated in the data processing environment. Data traffic that is verified to have no anomalies may be directed to the replicated data processing system. In this manner, the operation of the threatened data processing system may be restored with reduced impact on operation of other data processing systems in the data processing environment.

Figure 1:
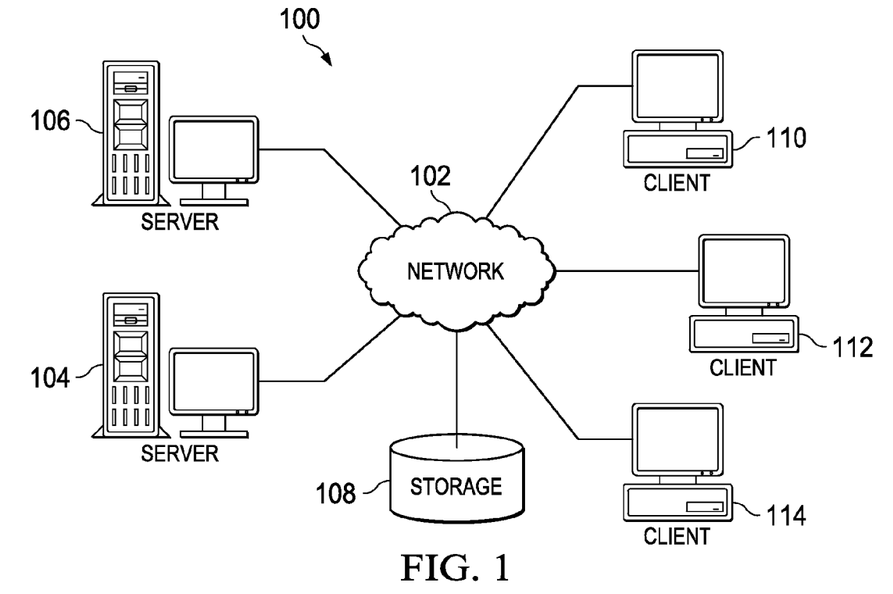
FIG. 1 is a pictorial representation of a network of data processing systems in accordance with an illustrative embodiment.

With reference now to the figures and, in particular, with reference to FIG. 1, an illustrative diagram of a data processing environment that may include a number of data processing systems is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

Turning now to FIG. 1, a pictorial representation of a network of data processing systems is depicted in accordance with an illustrative embodiment. In this example, network data processing system 100 is an example of one implementation of a network of computers in which illustrative embodiments may be implemented. Network data processing system 100 contains network 102, which is the medium used to provide communications links between various devices and computers connected together within network data processing system 100. Network 102 may include connections, such as wires, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computing devices or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
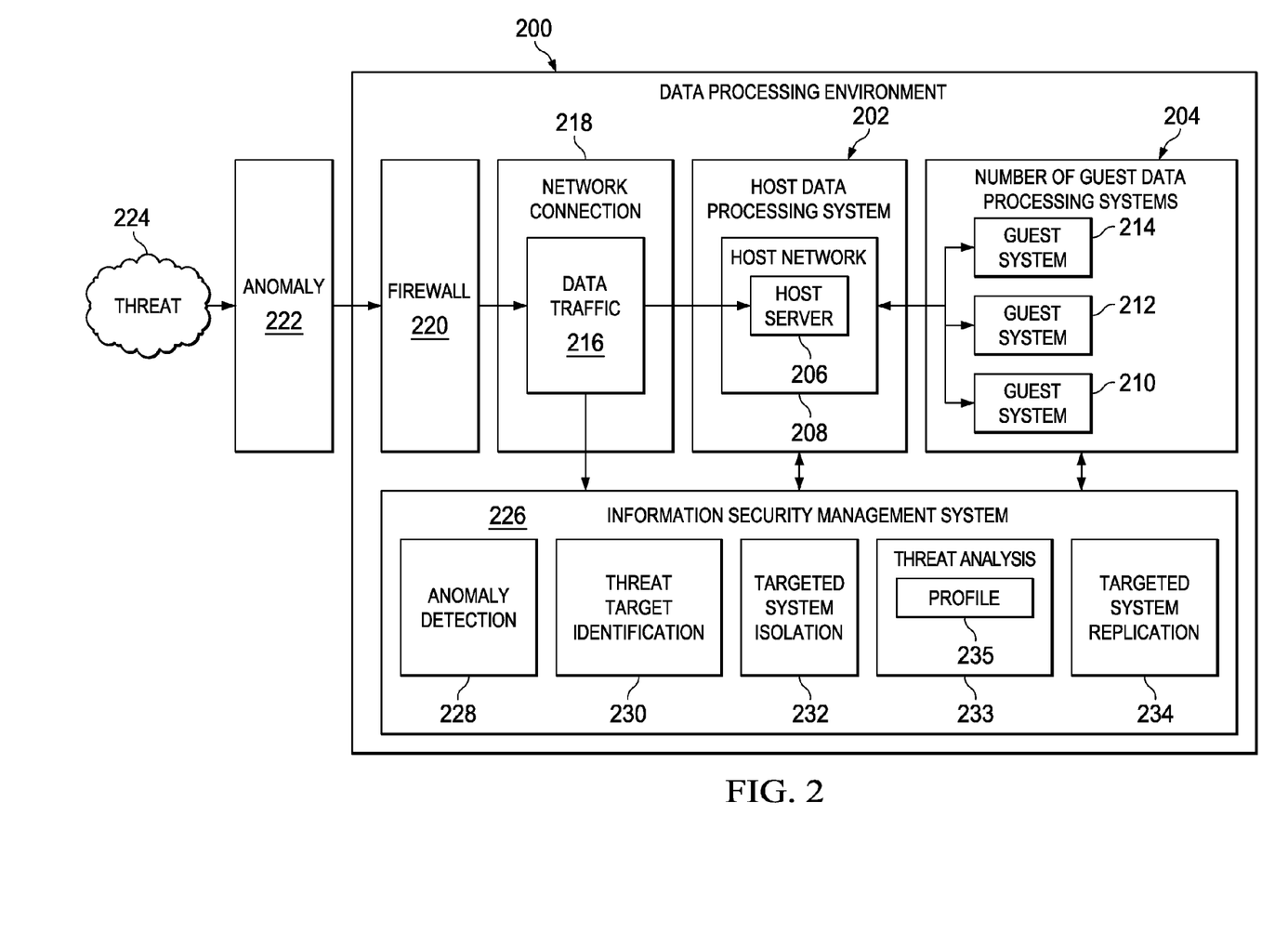
FIG. 2 is a block diagram of a data processing environment in accordance with an illustrative embodiment.

Turning now to FIG. 2, a block diagram of a data processing environment is depicted in accordance with an illustrative embodiment. In this example, data processing environment 200 is an example of one implementation of network data processing system 100 in FIG. 1.

Data processing environment 200 may include host data processing system 202 and number of guest data processing systems 204. In this example, host data processing system 202 may be an example of one implementation of server computer 104 or server computer 106 in FIG. 1. Host data processing system 202 may include host server 206. Host server 206 may be part of host network 208. Host server 206 may be in communication with number of guest data processing systems 204 via host network 208. Host network 208 may be configured using any appropriate communications media and protocols for providing the communication of data between host server 206 and number of guest data processing systems 204.

Number of guest data processing systems 204 may include any number of data processing systems associated as guests with host data processing system 202. In this example, number of guest data processing systems 204 includes guest system 210, guest system 212, and guest system 214. Number of guest data processing systems 204 may include more or fewer than three guest systems. In this example, guest system 210, guest system 212, and guest system 214 may be examples of implementations of client computer 110, client computer 112, and client computer 114 in FIG. 1.

Host data processing system 202 may be configured to receive data traffic 216 via network connection 218. Data traffic 216 also may be referred to as network traffic. Network connection 218 may provide a connection to a wide area network, a local area network, the Internet, or any other network or combination of networks. Network connection 218 may be a wireless connection, a wired connection, a fiber optic connection, or a connection using any other medium or combinations of media for the communication of data. The communication of data via network connection 218 may use any appropriate protocol or combinations of protocols for data communications. Data traffic 216 received by host data processing system 202 may be directed by host server 206 to number of guest data processing systems 204 via host network 208.

Data traffic 216 may be received via network connection 218 from a variety of sources. Firewall 220 may be provided in combination with network connection 218 to keep data processing environment 200 secure. Firewall 220 may be configured to control the incoming and outgoing of data traffic 216 by analyzing data traffic 216 and determining whether it should be allowed through. For example, without limitation, firewall 220 may be configured to analyze data packets in data traffic 216 or other characteristics of data traffic 216 based on a predetermined rule set to identify anomaly 222 in data traffic 216. Firewall 220 may be implemented in hardware or in software in combination with hardware.

Anomaly 222 in data traffic 216 may include any characteristic of data traffic 216 that indicates threat 224. Threat 224 may represent any unauthorized attempt to affect data processing environment 200. In particular, threat 224 may include any attempt to affect any part of data processing environment 200 in an undesired way. Data processing environment 200 may include any data that may be stored or processed in data processing environment 200. Therefore, threat 224 may include any unauthorized attempt to affect any data associated with data processing environment 200 or any attempt to affect any data associated with data processing environment 200 in an undesired way.

Threat 224 may be an intentional attempt to affect data processing environment 200 in an undesired way. In some cases, however, threat 224 may be unintentional. Although the presence of anomaly 222 in data traffic 216 may indicate threat 224, anomaly 222 itself may or may not be capable of affecting data processing environment 200 in an undesired way.

Information security management system 226 may be implemented in data processing environment 200 to protect data processing environment 200 from threat 224. Information security management system 226 may be configured to perform a variety of functions for identifying threat 224 and responding to threat 224 to protect data processing environment 200 from threat 224 while reducing disruptions to operations of data processing environment 200. For example, without limitation, information security management system 226 may be configured to provide anomaly detection 228, threat target identification 230, targeted system isolation 232, threat analysis 233, and targeted system replication 234. The various functions of information security management system 226 may be implemented in one location in data processing environment 200 or may be distributed at various locations in data processing environment 200.

Anomaly detection 228 may include detecting anomaly 222 in data traffic 216. Anomaly 222 may indicate threat 224 to data processing environment 200.

Threat target identification 230 may include identifying the part of data processing environment 200 to which threat 224 may be directed. For example, threat 224 may be directed to host data processing system 202 or to one of number of guest data processing systems 204. For example, without limitation, threat target identification 230 may identify the target of threat 224 from characteristics of anomaly 222 itself, from other information, or from characteristics of anomaly 222 in combination with other information.

Targeted system isolation 232 includes isolating the data processing system in data processing environment 200 that is the target of threat 224. The data processing system that is the target of threat 224 may be isolated in any appropriate manner to protect data processing environment 200 from threat 224. Data traffic 216 may continue to be directed to the isolated data processing system. The isolated data processing system and data traffic 216 directed thereto may be monitored.

Data traffic 216 directed to the isolated data processing system may include anomaly 222 indicating threat 224. Data traffic 216 directed to the isolated data processing system may be analyzed by threat analysis 233 to identify additional characteristics of threat 224, such as the intent of threat 224. For example, data traffic 216 directed to the isolated data processing system may be analyzed by threat analysis 233 to identify profile 235 of data traffic 216 indicating threat 224. For example, without limitation, profile 235 may include an identified pattern of data packets in data traffic 216, network transitions a given packet is taking, or other characteristics or combinations of characteristics of data traffic 216 to identify threat 224. Profile 235 may be used by information security management system 226 for more rapid and accurate identification and handling of threat 224 in the future.

Targeted system replication 234 may replicate the data processing system in data processing environment 200 that is the target of threat 224 to restore the functionality of the threatened data processing system in data processing environment 200. Data traffic 216 that has been verified not to contain any anomalies may be directed to the replicated data processing system in data processing environment 200.

The illustration of FIG. 2 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, without limitation, data processing environment 200 may be implemented, in whole or in part, in a cloud computing environment. In this case, one or more of host data processing system 202 and number of guest data processing systems 204 may be implemented using data processing resources that are provided as a service by a provider of data processing resources.

Figure 3:
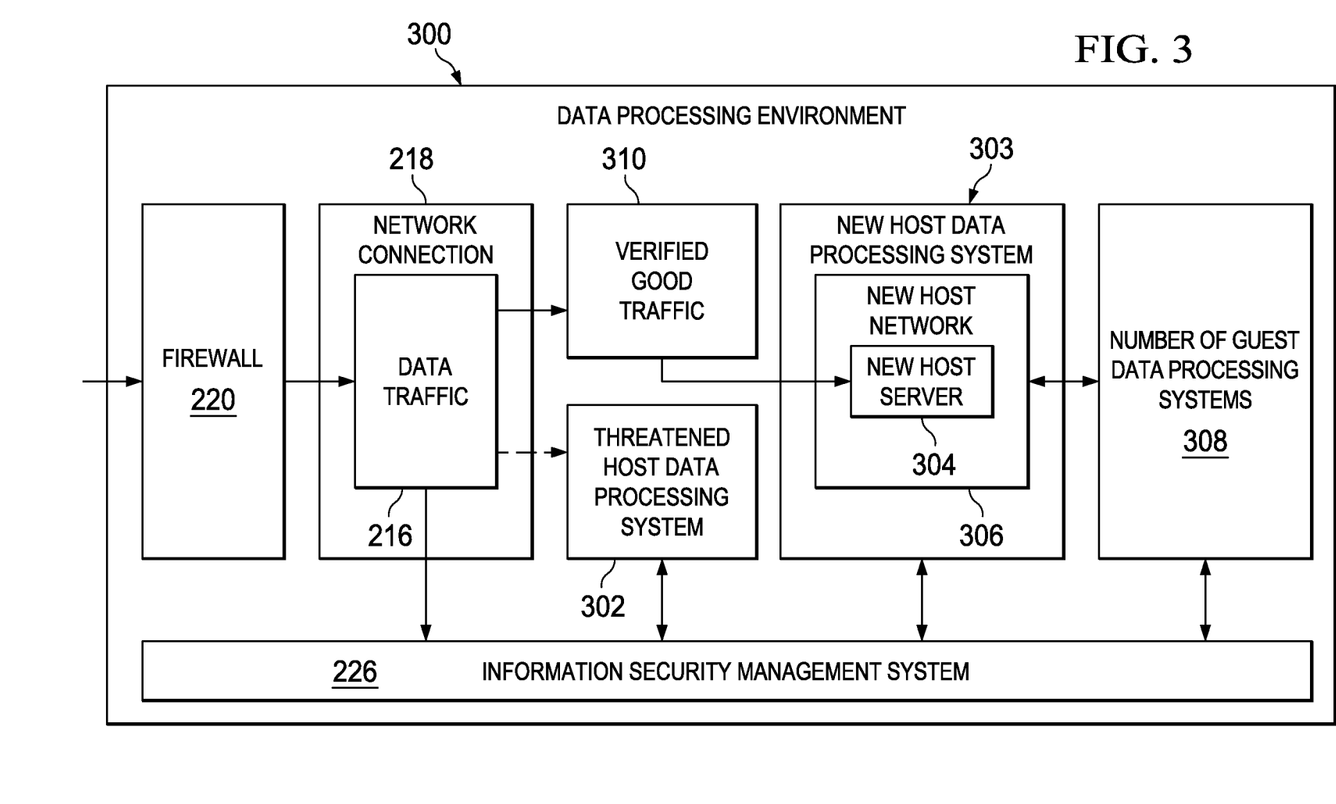
FIG. 3 is a block diagram of a data processing environment that has been reconfigured in response to a threat to a host data processing system in accordance with an illustrative embodiment.

Turning now to FIG. 3, a block diagram of a data processing environment that has been reconfigured in response to a threat to a host data processing system is depicted in accordance with an illustrative embodiment. In this example, data processing environment 300 is an example of data processing environment 200 in FIG. 2 after information security management system 226 in FIG. 2 has identified and responded to threat 224 directed to host data processing system 202 in data processing environment 200. In this example, therefore, threatened host data processing system 302 corresponds to host data processing system 202 in FIG. 2.

In response to identifying a threat to threatened host data processing system 302, threatened host data processing system 302 is isolated and new host data processing system 303 is started. New host data processing system 303 replicates the functionality of threatened host data processing system 302. New host data processing system 303 may include new host server 304 and new host network 306. Number of guest data processing systems 308 may be moved from threatened host data processing system 302 to new host data processing system 303. In this example, number of guest data processing systems 308 corresponds to number of guest data processing systems 204 in FIG. 2. Verified good traffic 310 may be directed to number of guest data processing systems 308 from data traffic 216 by new host server 304 via new host network 306. Verified good traffic 310 may include a portion of data traffic 216 that has been verified to contain no anomalies.

Data traffic 216 may continue to be directed to threatened host data processing system 302. Threatened host data processing system 302 is now isolated. Threatened host data processing system 302 and data traffic 216 directed thereto may be monitored under controlled conditions. Data traffic 216 directed to threatened host data processing system 302 may be analyzed to identify, for example, a profile of the threat to threatened host data processing system 302.

Figure 4:
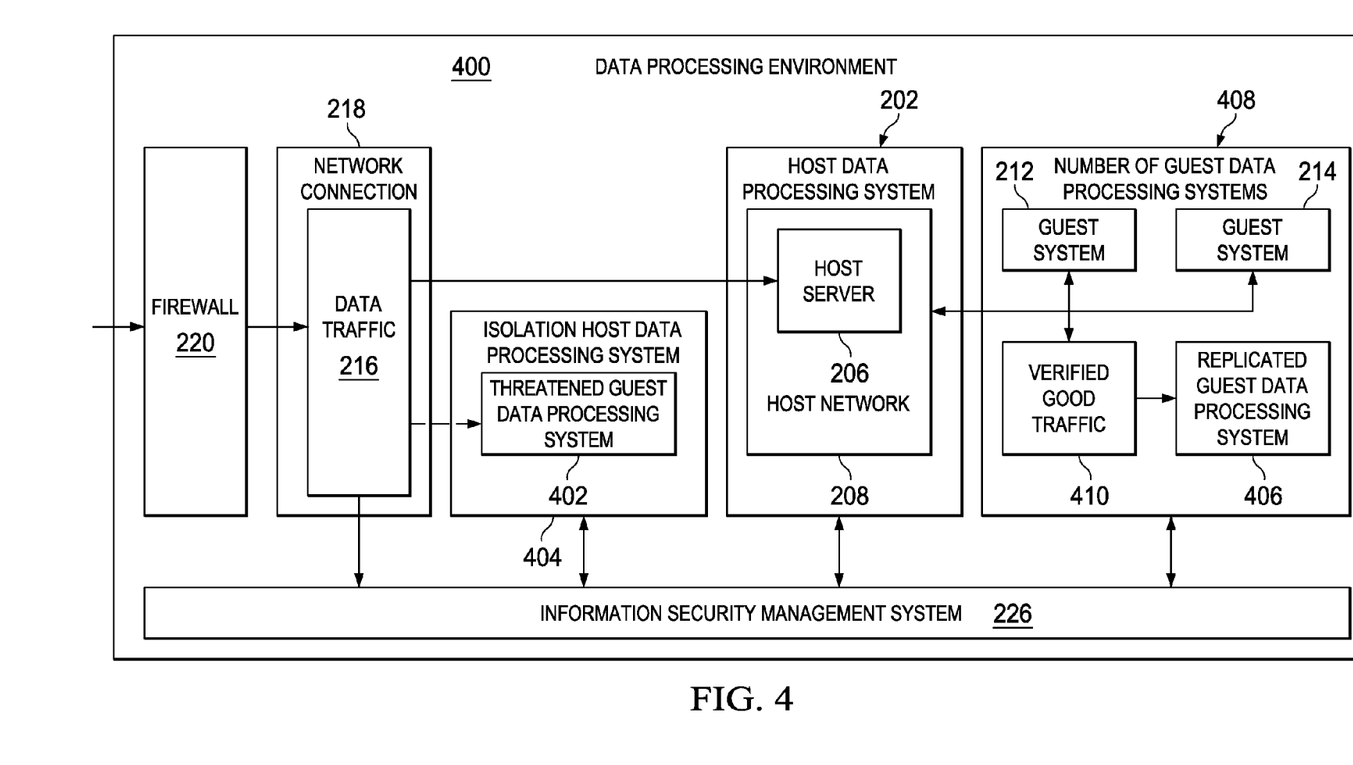
FIG. 4 is a block diagram of a data processing environment that has been reconfigured in response to a threat to a guest data processing system in accordance with an illustrative embodiment.

Turning now to FIG. 4, a block diagram of a data processing environment that has been reconfigured in response to a threat to a guest data processing system is depicted in accordance with an illustrative embodiment. In this example, data processing environment 400 is an example of data processing environment 200 in FIG. 2 after information security management system 226 in FIG. 2 has identified and responded to threat 224 to data processing environment 200. In particular, data processing environment 400 is an example of data processing environment 200 of FIG. 2 after information security management system 226 in FIG. 2 has identified threat 224 directed to guest system 210 in FIG. 2. In this example, therefore, threatened guest data processing system 402 corresponds to guest system 210 in FIG. 2.

In response to identifying a threat to threatened guest data processing system 402, threatened guest data processing system 402 is isolated. Isolation host data processing system 404 may be started. Isolation host data processing system 404 may be an isolated host data processing system configured to host threatened guest data processing system 402. Threatened guest data processing system 402 may be moved from host data processing system 202 to isolation host data processing system 404.

Data traffic 216 may be directed to threatened guest data processing system 402 via isolation host data processing system 404. Threatened guest data processing system 402 and data traffic 216 directed thereto may be monitored and profiled.

Replicated guest data processing system 406 may be started and associated with host data processing system 202. Replicated guest data processing system 406 replicates and replaces the functionality of threatened guest data processing system 402 as one of number of guest data processing systems 408 associated with host data processing system 202. Verified good traffic 410 from data traffic 216 may be directed to replicated guest data processing system 406 by host server 206 via host network 208.

Figure 5:
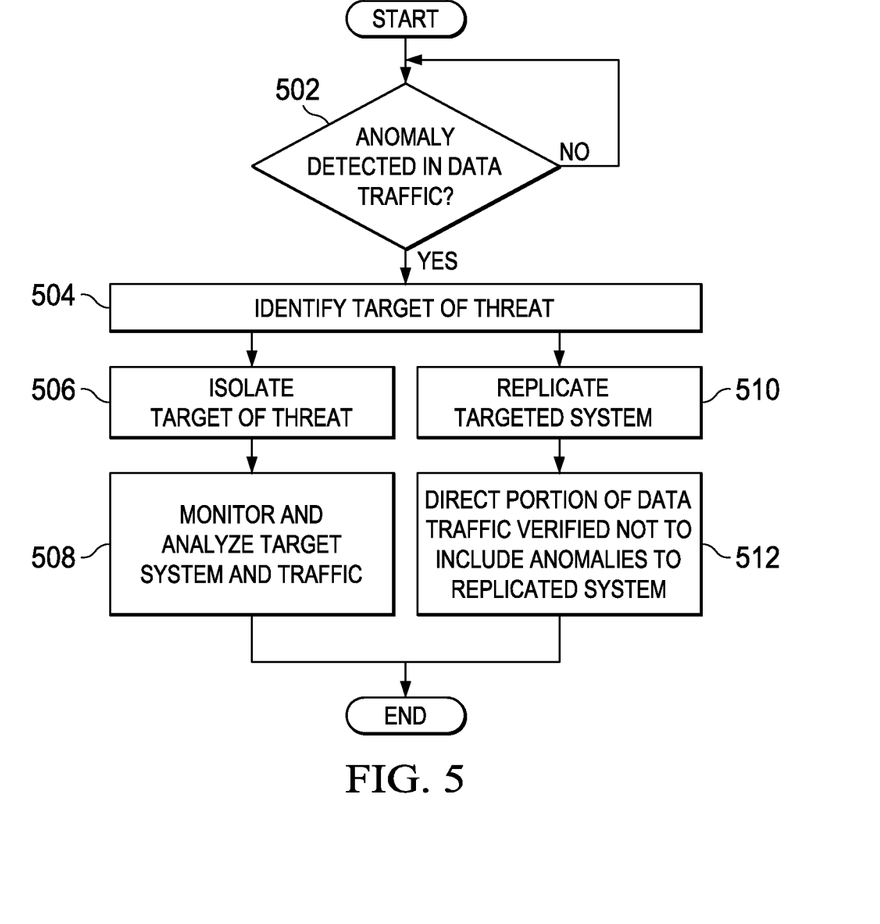
FIG. 5 is a flowchart of a general process for information security management in accordance with an illustrative embodiment.

Turing now to FIG. 5, a flowchart of a general process for information security management is depicted in accordance with an illustrative embodiment. This process may be implemented, for example, by information security management system 226 in data processing environment 200 in FIG. 2.

The process begins by determining whether an anomaly is detected in data traffic directed to a data processing environment (operation 502). An anomaly detected in the data traffic may indicate a threat to the data processing environment. If an anomaly is not detected in the data traffic, operation 502 may be repeated until an anomaly is detected in the data traffic.

If an anomaly is detected in the data traffic, the target of the threat may be identified (operation 504). For example, operation 504 may include identifying whether the threat is directed at the host data processing system or a guest data processing system in the data processing environment.

After the target of the threat is identified, the target of the threat may be isolated (operation 506). Network traffic may continue to be directed to the isolated system that is the target of the threat. The target system and traffic directed thereto may be monitored and analyzed (operation 508), with the process terminating thereafter.

At the same time that operations 506 and 508 are performed, the targeted system may be replicated (operation 510). For example, the replicated system may be a new host data processing system or a replicated guest data processing system. A portion of the data traffic that is verified not to include anomalies then may be directed to the replicated system (operation 512) with the process terminating thereafter.

Figure 6:
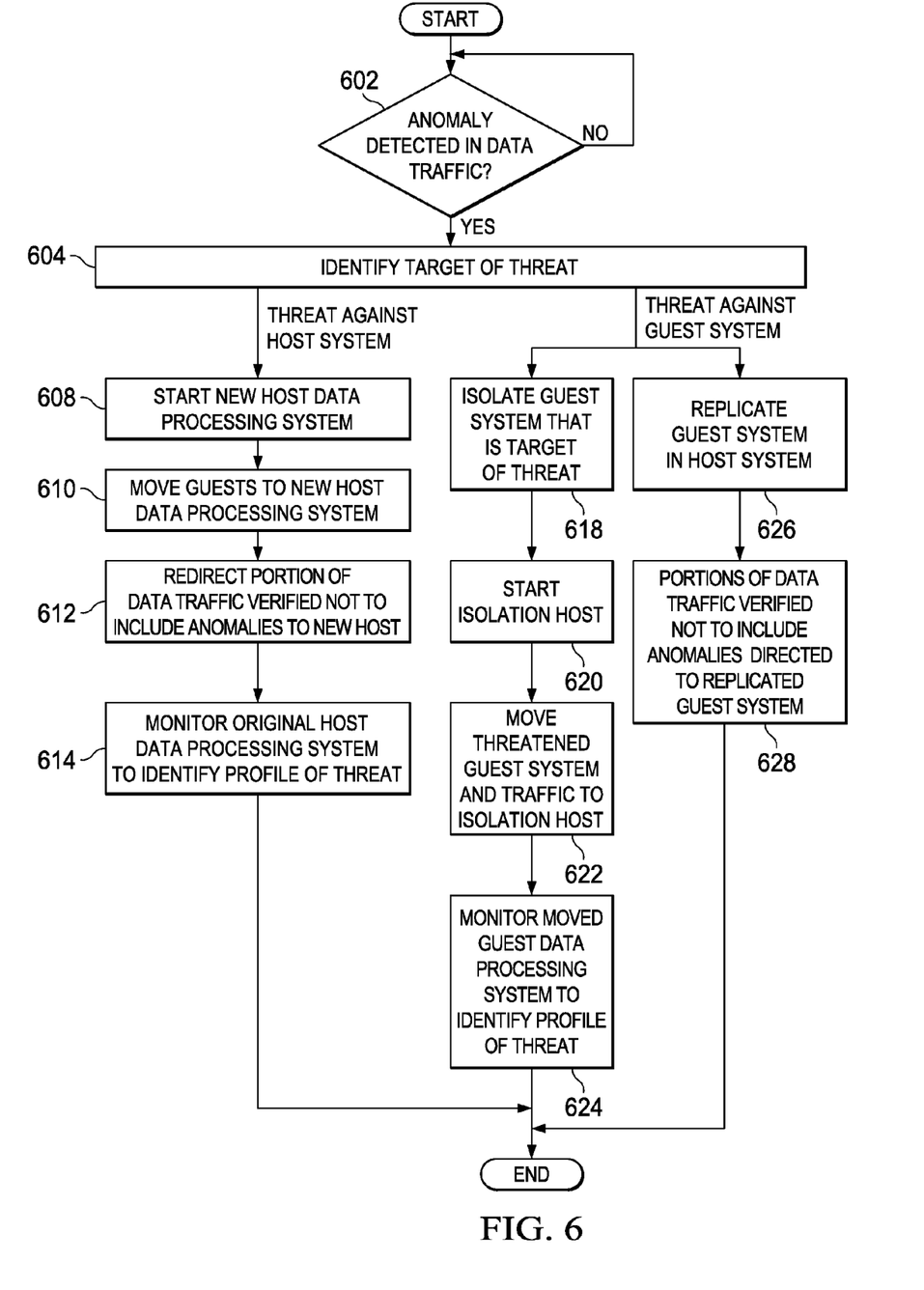
FIG. 6 is a more detailed flowchart of a process for information security management in accordance with an illustrative embodiment.

Turning now FIG. 6, a more detailed flowchart of a process for information security management is depicted in accordance with an illustrative embodiment. This process may be implemented, for example, by information security management system 226 in data processing environment 200 in FIG. 2.

The process begins by determining whether an anomaly is detected in data traffic directed to a data processing environment (operation 602). An anomaly detected in the data traffic may indicate a threat to the data processing environment. If an anomaly is not detected in the data traffic, operation 602 may be repeated until an anomaly is detected in the data traffic. If an anomaly is detected in the data traffic, the target of the threat may be identified (operation 604).

If the threat is identified at operation 604 as being directed against a host data processing system in the data processing environment, a new host data processing system may be started (operation 608). Guest data processing systems associated with the threatened host data processing system may be moved to the new host data processing system (operation 610). Data traffic verified not to include anomalies may be directed to the new host data processing system (operation 612). Data traffic may continue to be directed to the original threatened host data processing system. The original threatened host data processing system may be monitored under controlled conditions to identify a profile of the threat (operation 614), with the process terminating thereafter.

Returning to operation 604, if it is determined that the threat is directed against a guest data processing system, the guest data processing system that is the target of the threat may be isolated (operation 618). An isolation host data processing system may be started (operation 620). The threatened guest data processing system may be moved to the isolation host data processing system and data traffic directed to the threatened guest data processing system via the isolation host (operation 622). The moved guest data processing system and network traffic directed thereto may be monitored to identify a profile of the threat (operation 624), with the process terminating thereafter.

At the same time as operations 618, 620, 622, and 624 are performed, in response to a determination that the threat is directed against a guest data processing system, the guest data processing system that is the target of the threat may be replicated in the host data processing system (operation 626). Portions of the data traffic verified not to include anomalies may be directed to the replicated guest data processing system (operation 628), with the process terminating thereafter.

Figure 7:
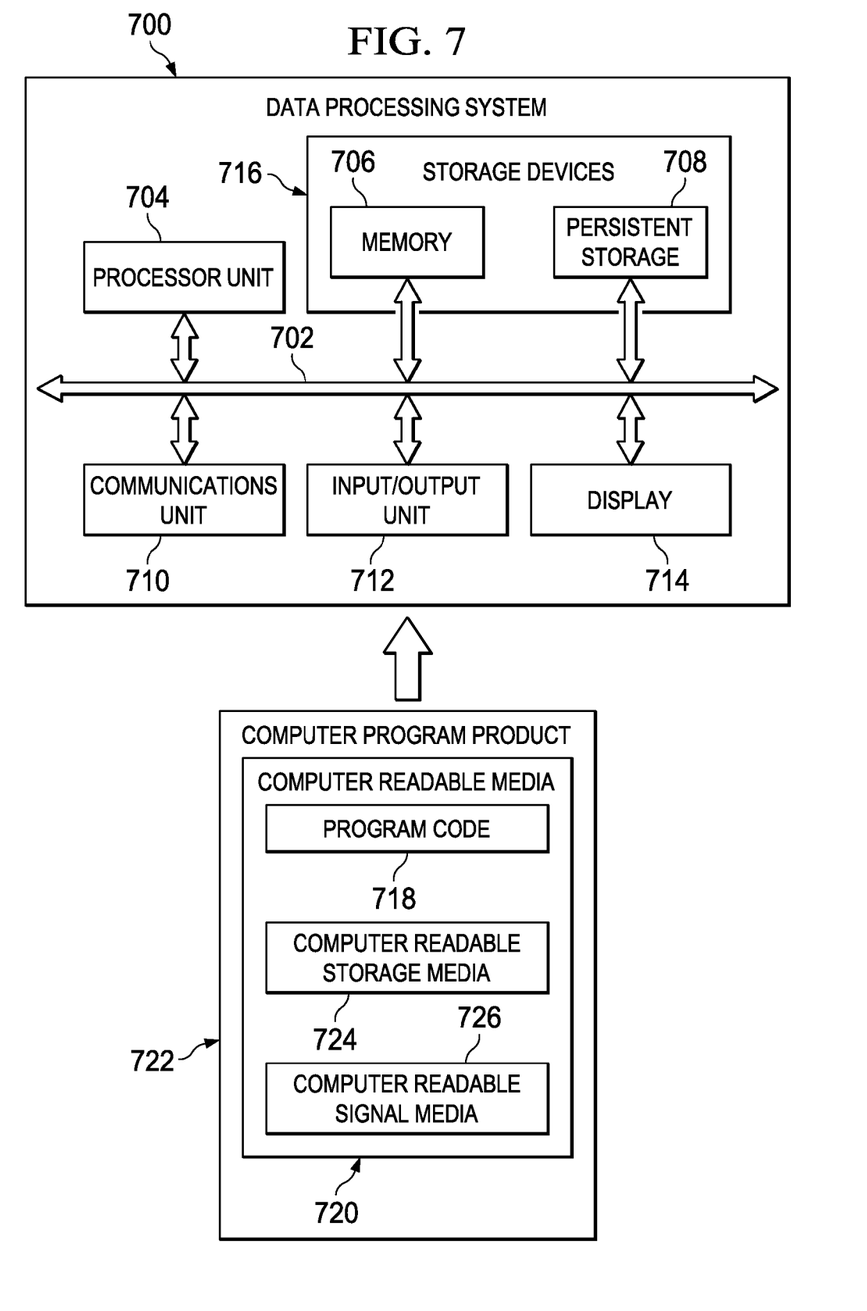
FIG. 7 is an illustration of a block diagram of a data processing system in accordance with an illustrative embodiment.

Turning now to FIG. 7, an illustration of a block diagram of a data processing system is depicted in accordance with an illustrative embodiment. In this example, data processing system 700 is an example of one implementation of a data processing system for implementing host data processing system 202, number of guest data processing systems 204, or information security management system 226 in FIG. 2.

In this illustrative example, data processing system 700 includes communications fabric 702. Communications fabric 702 provides communications between processor unit 704, memory 706, persistent storage 708, communications unit 710, input/output unit 712, and display 714. Memory 706, persistent storage 708, communications unit 710, input/output unit 712, and display 714 are examples of resources accessible by processor unit 704 via communications fabric 702.

Processor unit 704 serves to run instructions for software that may be loaded into memory 706. Processor unit 704 may be a number of processors, a multi-processor core, or some other type of processor, depending on the particular implementation. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and other suitable information either on a temporary basis or a permanent basis. Storage devices 716 also may be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer-implemented instructions, which may be located in a memory, such as memory 706.

These instructions are referred to as program instructions, program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code. As one example, data processing system 700 may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

Additionally, communications unit 710 may include a number of devices that transmit data, receive data, or both transmit and receive data. Communications unit 710 may be, for example, a modem or a network adapter, two network adapters, or some combination thereof. Further, a memory may be, for example, memory 706, or a cache, such as that found in an interface and memory controller hub that may be present in communications fabric 702.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for information security management, comprising:
   identifying an anomaly in data traffic directed to a data processing environment, wherein the anomaly indicates a threat to the data processing environment and the data processing environment comprises a plurality of data processing systems;
   identifying a threatened data processing system, wherein the threatened data processing system is one of the plurality of data processing systems to which the threat is directed;
   isolating the threatened data processing system;
   monitoring the threatened data processing system after isolating the threatened data processing system;
   replicating the threatened data processing system to form a replicate data processing system; and
   directing a portion of the data traffic that is verified not to include anomalies to the replicated data processing system.

2. The method of claim 1 further comprising:
   directing the data traffic to the threatened data processing system after isolating the threatened data processing system; and
   monitoring the data traffic directed to the threatened data processing system after isolating the threatened data processing system.

3. The method of claim 2, wherein the data traffic directed to the threatened data processing system after isolating the threatened data processing system comprises the data traffic indicating the threat and further comprising:
   identifying a profile of the data traffic indicating the threat.

4. The method of claim 1, wherein the plurality of data processing systems comprises a host data processing system and a number of guest data processing systems associated with the host data processing system, the threatened data processing system is the host data processing system, and the replicated data processing system comprises a new host data processing system and further comprising:
   moving the number of guest data processing systems from the threatened data processing system to the new host data processing system.

5. The method of claim 1, wherein isolating the threatened data processing system comprises:
   moving the threatened data processing system to an isolation host data processing system, wherein:
      the plurality of data processing systems comprises a host data processing system and a number of guest data processing systems associated with the host processing system;

the threatened data processing system is one of the number of guest data processing systems; and the replicated data processing system comprises a replicated guest data processing system associated with the host data processing system.

6. An apparatus comprising:
an information security management system implemented in a data processing environment, the data processing environment comprising a plurality of data processing systems, wherein the information security management system is configured to:
identify an anomaly in data traffic directed to a data processing environment, wherein the anomaly indicates a threat to the data processing environment;
identify a threatened data processing system, wherein the threatened data processing system is one of the plurality of data processing systems to which the threat is directed;
isolate the threatened data processing system;
monitor the threatened data processing system after the threatened data processing system is isolated;
replicate the threatened data processing system to form a replicated data processing system; and
direct a portion of the data traffic that is verified not to include anomalies to the replicated data processing system.

7. The apparatus of claim 6, wherein the information security management system is further configured to direct the data traffic to the threatened data processing system after the threatened data processing system is isolated and monitor the data traffic directed to the threatened data processing system after the threatened data processing system is isolated.

8. The apparatus of claim 7, wherein:
the data traffic directed to the threatened data processing system after the threatened data processing system is isolated comprises the data traffic indicating the threat; and
the information security management system is further configured to identify a profile of the data traffic indicating the threat.

9. The apparatus of claim 6, wherein:
the plurality of data processing systems comprises a host data processing system and a number of guest data processing systems associated with the host data processing system;
the threatened data processing system is the host data processing system;
the replicated data processing system comprises a new host data processing system; and
the information security management system is further configured to move the number of guest data processing systems from the threatened data processing system to the new host data processing system.

10. The apparatus of claim 6, wherein:
the plurality of data processing systems comprises a host data processing system and a number of guest data processing systems associated with the host data processing system;
the threatened data processing system is one of the number of guest data processing systems;
the information security management system is configured to move the threatened data processing system to an isolation host data processing system to isolate the threatened data processing system; and
the replicated data processing system comprises a replicated guest data processing system associated with the host data processing system.

11. A method for information security management, comprising:
identifying an anomaly in data traffic directed to a data processing environment, wherein the anomaly indicates a threat to the data processing environment and the data processing environment comprises a threatened host data processing system and a number of guest data processing systems associated with the threatened host data processing system;
responsive to identifying the threat being directed to the threatened host data processing system, moving the number of guest data processing systems from the threatened host data processing system to a new host data processing system;
directing a portion of the data traffic that is verified not to include anomalies to the new host data processing system;
directing the data traffic to the threatened host data processing system after moving the number of guest data processing systems from the threatened host data processing system to the new host data processing system; and
monitoring the threatened host data processing system after moving the number of guest data processing systems from the threatened host data processing system to the new host data processing system.

12. The method of claim 11, wherein monitoring the threatened host data processing system comprises:
monitoring the data traffic directed to the threatened host data processing system after moving the number of guest data processing systems from the threatened host data processing system to the new host data processing system.

13. The method of claim 12, wherein the data traffic directed to the threatened host data processing system after moving the number of guest data processing systems from the threatened host data processing system to the new host data processing system comprises the data traffic indicating the threat and further comprising:
identifying a profile of the data traffic indicating the threat.

14. An apparatus comprising:
an information security management system implemented in a data processing environment, the data processing environment comprising a threatened host data processing system and a number of guest data processing systems associated with the threatened host data processing system, wherein the information security management system is configured to:
identify an anomaly in data traffic directed to the data processing environment, wherein the anomaly indicates a threat to the data processing environment;
move the number of guest data processing systems from the threatened host data processing system to a new host data processing system responsive to identifying the threat being directed to the threatened host data processing system;
direct a portion of the data traffic that is verified not to include anomalies to the new host data processing system;
direct the data traffic to the threatened host data processing system after the number of guest data processing systems are moved from the threatened host data processing system to the new host data processing system; and
monitor the threatened host data processing system after the number of guest data processing systems are moved from the threatened host data processing system to the new host data processing system.

15. The apparatus of claim 14, wherein the information security management system is configured to monitor the data traffic directed to the threatened host data processing system after the number of guest data processing systems are moved from the threatened host data processing system to the new host data processing system.

16. The apparatus of claim 15, wherein the data traffic directed to the threatened host data processing system after the number of guest data processing systems are moved from the threatened host data processing system comprises data traffic indicating the threat and wherein the information security management system is further configured to identify a profile of the data traffic indicating the threat.

17. A method for information security management, comprising:
 identifying an anomaly in data traffic directed to a data processing environment, wherein the anomaly indicates a threat to the data processing environment and the data processing environment comprises a host data processing system and a number of guest data processing systems associated with the host data processing system;
 responsive to identifying the threat being directed to a threatened guest data processing system, wherein the threatened guest data processing system is one of the number of guest data processing systems, replicating the threatened guest data processing system to form a replicated guest data processing system associated with the host data processing system;
 directing a portion of the data traffic that is verified not to include anomalies to the replicated guest data processing system;
 moving the threatened guest data processing system to an isolation host data processing system;
 directing the data traffic to the threatened guest data processing system after moving the threatened guest data processing system to the isolation host data processing system; and
 monitoring the threatened guest data processing system after moving the threatened guest data processing system to the isolation host data processing system.

18. The method of claim 17, wherein monitoring the threatened guest data processing system comprises:
 monitoring the data traffic directed to the threatened guest data processing system after moving the threatened guest data processing system to the isolation host data processing system.

19. The method of claim 18, wherein the data traffic directed to the threatened guest data processing system after moving the threatened guest data processing system to the isolation host data processing system comprises data traffic indicating the threat and further comprising:
 identifying a profile of the data traffic indicating the threat.

20. An apparatus, comprising:
 an information security management system implemented in a data processing environment, the data processing environment comprising a host data processing system and a number of guest data processing systems associated with the host data processing system, wherein the information security management system is configured to:
  identify an anomaly in data traffic directed to the data processing environment, wherein the anomaly indicates a threat to the data processing environment;
  replicate a threatened guest data processing system to form a replicated guest data processing system associated with the host data processing system responsive to the threat being directed to the threatened guest data processing system, wherein the threatened guest data processing system is one of the number of guest data processing systems;
  direct a portion of the data traffic that is verified not to include anomalies to the replicated guest data processing system;
  move the threatened guest data processing system to an isolation host data processing system;
  direct the data traffic to the threatened guest data processing system after the threatened guest data processing system is moved to the isolation host data processing system; and
  monitor the threatened guest data processing system after the threatened guest data processing system is moved to the isolation host data processing system.

21. The apparatus of claim 20, wherein the information security management system is configured to monitor the data traffic directed to the threatened guest data processing system after the threatened guest data processing system is moved to the isolation host data processing system.

22. The apparatus of claim 21, wherein the data traffic directed to the threatened guest data processing system after the threatened guest data processing system is moved to the isolation host data processing system comprises data traffic indicating the threat and wherein the information security management system is configured to identify a profile of the data traffic indicating the threat.

* * * * *